(12) United States Patent
Fifield (10) Patent No.: US 7,493,152 B1
(45) Date of Patent: Feb. 17, 2009

(54) INTEGRATED CIRCUIT INCORPORATING ANTENNAS

(75) Inventor: David Fifield, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 527 days.

(21) Appl. No.: 11/001,525

(22) Filed: Dec. 1, 2004

(51) Int. Cl.
*H04M 1/00* (2006.01)
*H04B 7/00* (2006.01)

(52) U.S. Cl. .............. 455/575.7; 455/556.1; 455/552.1; 455/41.1

(58) Field of Classification Search .............. 455/575.1, 455/550.1, 101, 557, 552.1, 553.1, 556.1, 455/575.7; 343/702, 767
See application file for complete search history.

(56) References Cited

U.S. PATENT DOCUMENTS

| | | | | |
|---|---|---|---|---|
| 5,613,219 | A * | 3/1997 | Vogel et al. ................... | 455/78 |
| 7,177,662 | B2 * | 2/2007 | Trachewsky et al. ...... | 455/552.1 |
| 2003/0219035 | A1 * | 11/2003 | Schmidt ...................... | 370/478 |
| 2004/0048572 | A1 * | 3/2004 | Godfrey ...................... | 455/41.2 |
| 2005/0208900 | A1 * | 9/2005 | Karacaoglu ................... | 455/78 |
| 2005/0215287 | A1 * | 9/2005 | Efland et al. .............. | 455/562.1 |
| 2006/0116182 | A1 * | 6/2006 | Bekritsky ................ | 455/575.7 |
| 2006/0160563 | A1 * | 7/2006 | Ku ........................... | 455/552.1 |

* cited by examiner

*Primary Examiner*—Tilahun B Gesesse
(74) *Attorney, Agent, or Firm*—Garlick Harrison & Markison (57) ABSTRACT

A method and system implementing wireless communication using one or more antenna elements in an integrated circuit. In one embodiment of the invention, one or more antenna elements are placed in the integrated circuit substrate. In an alternate embodiment of the invention, one or more antenna elements can be placed inside the integrated circuit packaging at a position above the substrate. In another embodiment of the invention, one or more antenna elements can be placed on the outer surface of the integrated circuit package. In further alternate embodiments of the invention, multiple antenna elements are placed inside or on the surface of the integrated circuit with the individual antenna elements being placed in an orientation to optimize signal strength. In one embodiment, multiple antenna elements are placed inside or on the surface of the integrated circuit in an orientation to maximize the signal strength for an RF signal at a single frequency. In various embodiments of the invention, a diversity switch is operable to selectively connected antenna elements to enable wireless communication at a plurality of frequencies.

24 Claims, 9 Drawing Sheets

INTEGRATED CIRCUIT INCORPORATING ANTENNAS

BACKGROUND OF THE INVENTION

1. Field of the Invention

The present invention is directed in general to wireless communication systems. In one aspect, the present invention relates to a method and system for incorporating one or more antennas into an integrated circuit used in a wireless communication system.

2. Related Art

Communication systems are known to support wireless and wire-lined communications between wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth (BT), advanced mobile phone services (AMPS), digital AMPS, global system for mobile communications (GSM), code division multiple access (CDMA), local multi-point distribution systems (LMDS), multi-channel-multi-point distribution systems (MMDS) and/or variations thereof.

Depending on the type of wireless communication system, a wireless communication device (such as a cellular telephone, two-way radio, personal digital assistant (PDA), personal computer (PC), laptop computer, home entertainment equipment, etc.) communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over the tuned channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switched telephone network, via the Internet, and/or via some other wide area network.

Wireless communication devices typically communicate with one another using a radio transceiver (i.e., receiver and transmitter) that may be incorporated in, or coupled to, the wireless communication device. The transmitter typically includes a data modulation stage, one or more intermediate frequency stages and a power amplifier. The data modulation stage converts raw data into baseband signals in accordance with a particular wireless communication standard. The intermediate frequency stages mix the baseband signals with one or more local oscillations to produce RF signals. The power amplifier amplifies the RF signals prior to transmission via an antenna. In direct conversion transmitters/receivers, conversion directly between baseband signals and RF signals is performed. The receiver is typically coupled to an antenna and includes a low noise amplifier, one or more intermediate frequency stages, a filtering stage and a data recovery stage. The low noise amplifier receives inbound RF signals via the antenna and amplifies them. The intermediate frequency stages mix the amplified RF signals with one or more local oscillations to covert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Wireless communication systems are typically implemented using one or more integrated circuits. Antenna placement and orientation is essential to obtain adequate signal strength to enable operation of the wireless communication system. In addition, as space constraints limit the size of the components used in wireless devices, antenna placement and orientation is a serious constraint.

Maintaining proper antenna orientation is a significant problem for portable devices such as laptop computers and personal digital assistants (PDAs) that are constantly being moved, thereby changing the orientation of the antennas used to receive the RF signals. As will be understood by those of skill in the art, RF signals have a polarization and the antenna must be properly oriented with respect to this polarization to maximize the signal strength. To maximize the likelihood of receiving a strong RF signal, many transceiver use multiple antenna elements that have physical characteristics that are tuned to maximize the RF signal strength at a particular frequency. However, prior art systems have not provided a system for ensuring proper orientation of antennas in portable wireless communication devices to ensure maximum RF signal strength.

The problems discussed above with regard to antenna placement are exacerbated in systems that include two or more radio transceivers with two or more antennas. Many wireless devices currently use two or more radio transceivers, where each radio transceiver is compliant with any of a variety of wireless communication standards may be used with the exemplary communication systems described herein, including Bluetooth, IEEE 802.11(a), (b), (g) and others. For instance, a computer may include two radio transceivers, one for interfacing with an 802.11a wireless local area network (WLAN) device and another for interfacing with an 802.11g WLAN device. In this example, the 802.11g transceiver operates in the 2.4 GHz frequency range and the 802.11a transceiver operates in the 5 GHz frequency range.

In view of the foregoing, there is a need for an improved method and apparatus for placing an antenna in an integrated circuit substrate and for orienting antennas on the integrated circuit to ensure maximum signal strength. Further limitations and disadvantages of conventional systems will become apparent to one of skill in the art after reviewing the remainder of the present application with reference to the drawings and detailed description which follow.

SUMMARY OF THE INVENTION

Broadly speaking, the present invention provides a method and system for optimal placement of one or more antenna elements in an integrated circuit. The present invention can be implemented by placing one or more antenna elements at various locations in the integrated circuit. In one embodiment of the invention, one or more antenna elements are placed in the integrated circuit substrate. In an alternate embodiment of the invention, one or more antenna elements can be placed inside the integrated circuit packaging at a position above the substrate. In another embodiment of the invention, one or more antenna elements can be placed on the outer surface of the integrated circuit package.

In further alternate embodiments of the invention, multiple antenna elements are placed inside or on the surface of the integrated circuit, with the individual antenna elements being placed in an orientation to optimize signal strength. In one embodiment, multiple antenna elements are place inside or on the surface of the integrated circuit in an orientation to maximize the signal strength for an RF signal at a single frequency. A wireless communication system implementing the present invention comprises a diversity switch that is operable to control which of the individual antenna elements is connected to the RF module of the wireless interface. In various embodiments of the invention, the diversity switch is operable to selectively connected antenna elements to enable wireless communication at a plurality of frequencies.

The objects, advantages and other novel features of the present invention will be apparent from the following detailed description when read in conjunction with the appended claims and attached drawings.

The objects, advantages and other novel features of the present invention will be apparent from the following detailed description when read in conjunction with the appended claims and attached drawings.

DETAILED DESCRIPTION

A method and apparatus for an improved wireless communication system is described. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of communication systems to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memorizes or registers or other such information storage, transmission or display devices.

Figure 1:
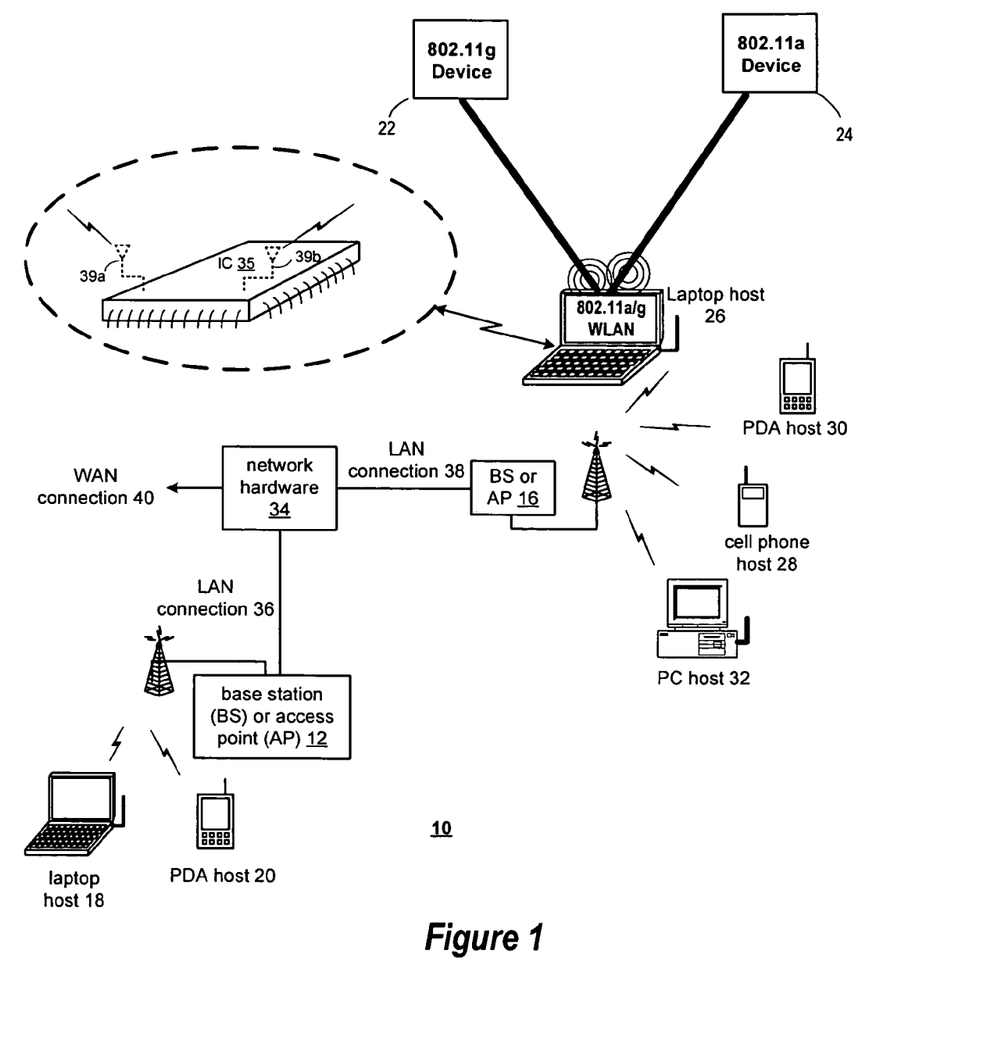
FIG. 1 is a schematic block diagram of a wireless communication system in accordance with the present invention.

FIG. 1 illustrates a wireless communication system 10 in which embodiments of the present invention may operate. As illustrated, the wireless communication system 10 includes a plurality of base stations and/or access points 12, 16, a plurality of wireless communication devices 18-32 and a network hardware component 34. The wireless communication devices 18-32 may be laptop host computers 18 and 26, personal digital assistant hosts 20 and 30, personal computer hosts 32, cellular telephone hosts 28, an 802.11a WLAN device 22 and/or an 802.11g WLAN device 24. The details of the wireless communication devices will be described in greater detail hereinbelow.

As illustrated, the base stations or access points 12, 16 are operably coupled to the network hardware 34 via local area network connections 36, 38. The network hardware 34 (which may be a router, switch, bridge, modem, system controller, etc.) provides a wide area network connection 40 for the communication system 10. Each of the base stations or access points 12, 16 has an associated antenna or antenna array to communicate with the wireless communication devices in its area. Typically, the wireless communication devices register with a particular base station for access point 12, 16 to receive services from the communication system 10. For direct connections (i.e., point-to-point communications), wireless communication devices communicate directly via an allocated channel. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

As will be understood by those of skill in the art, the circuitry for enabling wireless communication by the various system components illustrated in FIG. 1 can be implemented using one or more integrated circuits, such as integrated circuit 35. Furthermore, as will be discussed in greater detail hereinbelow, the integrated circuit 35 may include multiple antenna elements illustrated generally by reference numerals 39a and 39b for implementing wireless communications. As will be discussed hereinbelow, however, various embodiments of the present invention can be implemented to enable communications on multiple frequencies. In the embodiments wherein communications are enabled on multiple frequencies, the integrated circuit may comprise multiple antenna elements for the system components communicating on each of the frequencies to enhance operation of the wireless system.

Figure 2:
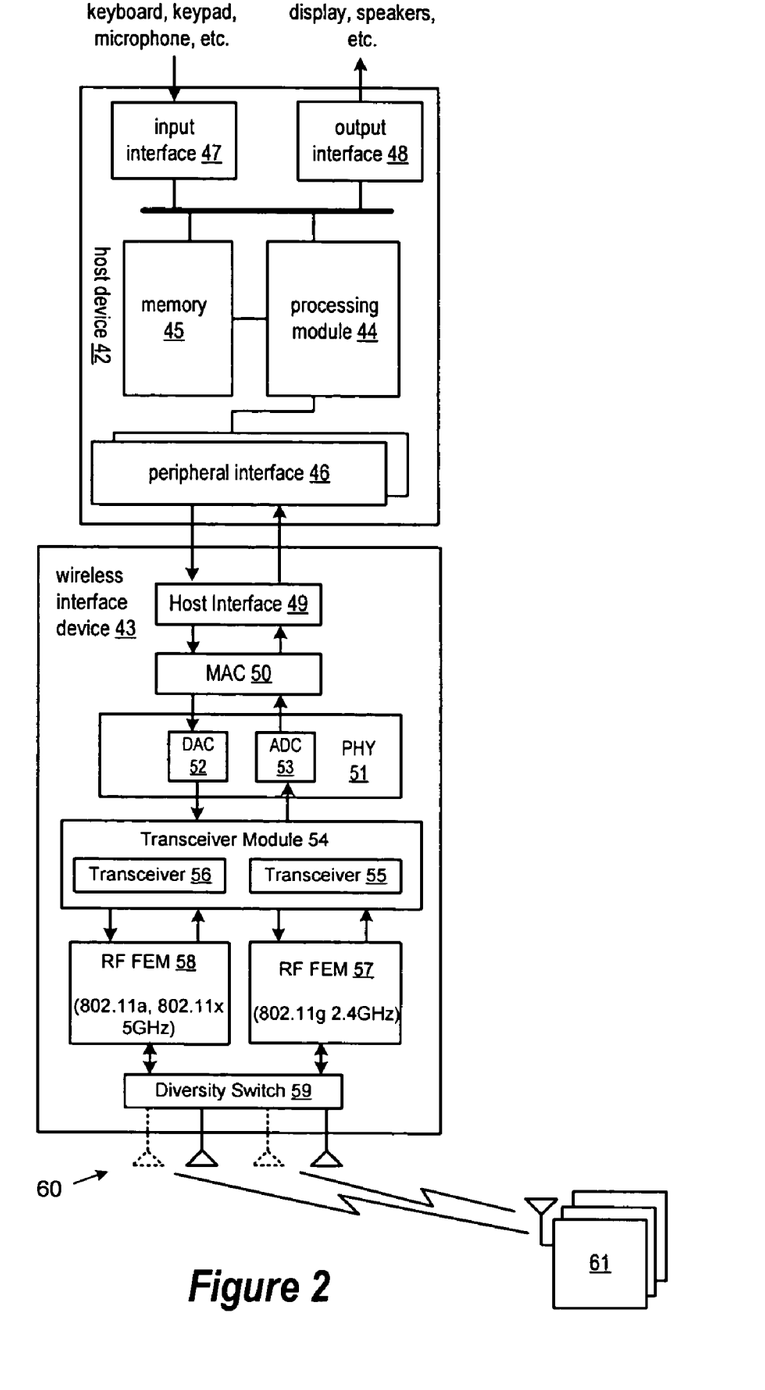
FIG. 2 is a schematic block diagram of a wireless communication device in accordance with the present invention.

FIG. 2 is a schematic block diagram illustrating a radio implemented in a wireless communication device that includes the host device or module 42 and at least one wireless interface device, or radio transceiver 43. The wireless interface device may be built in components of the host device 42 or externally coupled components. As illustrated, the host device 42 includes a processing module 44, memory 45, peripheral interface 46, input interface 47 and output interface 48. The processing module 44 and memory 42 execute the corresponding instructions that are typically processed by the host device. For example, in a cellular telephone device, the processing module 44 performs the corresponding communication functions in accordance with a particular cellular telephone standard. For data received from the wireless interface device 43 (e.g., inbound data), the peripheral interface 46 provides the data to the processing module 44 for further processing and/or routing to the output interface 48. The output interface 48 provides connectivity to an output display device such as a display, monitor, speakers, etc., such that the received data may be displayed. The peripheral interface 46 also provides data from the processing module 44 to the wireless interface device 43. The processing module 44 may receive the outbound data from an input device such as a keyboard, keypad, microphone, etc. via the input interface 47 or generate the data itself. For data received via the input interface 47, the processing module 44 may perform a corresponding host function on the data and/or route it to the wireless interface device 43 via the peripheral interface 46.

The wireless interface device 43 includes a host interface 49, a media-specific access control protocol (MAC) layer module 50, a physical layer module (PHY) 104, a digital-to-analog converter (DAC) 52, and an analog to digital converter (ADC) 53. Typically, transmit data coming from the host device 42 is presented to the MAC 50, which in turn presents it to the PHY 51. The PHY 51 processes the transmit data (scrambling, encoding, modulation, etc.) and then transfers its output to the DAC 52 for conversion to an analog signal. The DAC output is then gained and filtered and passed to the transceiver module 54 that may comprises a plurality of transceivers, such as transceiver 55 and transceiver 56 operating at different frequencies as discussed below. The transceivers 55 and 56 transmit data to and receive data from the respective front end modules 57 and 58 discussed below in connection with FIG. 3. The front end modules 57 and 58 are operably connected to a diversity switch that controls the transfer of data between the front end modules and a plurality of antenna elements 43 for communication with wireless communication device(s) 61. As will be understood by those of skill in the art, the methods by which the MAC and/or PHY layer modules detect, adjust and/or route the control signals for the diversity switch 59 may be executed by the processing module(s) and other transceiver module(s) included in the wireless interface device 43, or may alternatively be executed by the processing functionality in the host device 42.

On the receive side, data received via the front end modules 57, 58 and transceivers 56, 55 is gained and filtered, then transferred to ADC 53 for conversion to a digital signal. This digital signal is processed (demapped, decoded, descrambled, etc.) by the PHY 51 and the bits are passed through the MAC 50 to the host 42 for delivery to the output interface 48. As will be appreciated, the modules in the wireless interface device are implemented with a communications processor and an associated memory for storing and executing instructions that control the access to the physical transmission medium in the wireless network.

Each of the external device(s) 6 includes its own wireless interface device for communicating with the wireless interface device of the host device. For example, the host device may be personal or laptop computer and the external device (s) 61 may be a headset, personal digital assistant, cellular telephone, printer, fax machine, joystick, keyboard, desktop telephone, or access point of a wireless local area network.

The teachings of the present invention can be implemented to enable wireless communications on a variety of communications frequencies. For purposes of discussion, however, the present invention will be illustrated with wireless communication components for communication using a 2.4 GHz signal in accordance with the 802.11g standard and a 5 GHz signal in accordance with the 802.11a standard.

Figure 3:
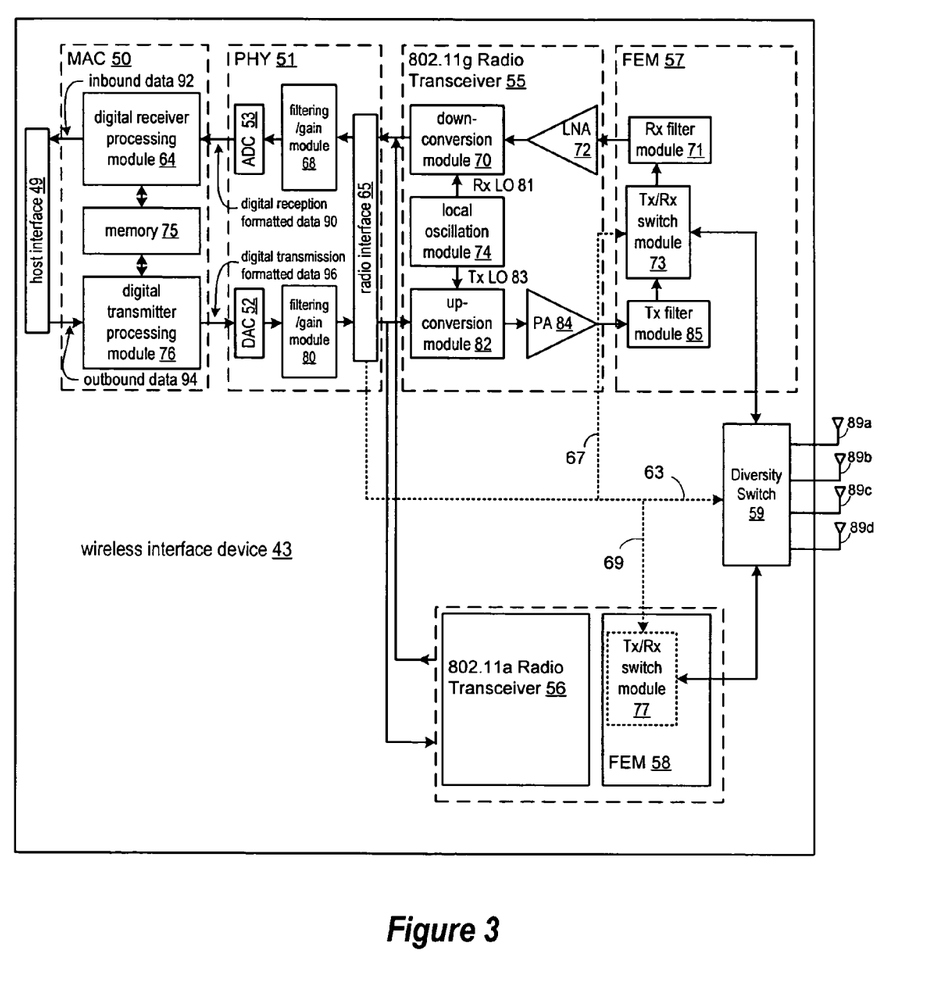
FIG. 3 is a schematic block diagram of a wireless interface device in accordance with the present invention.

FIG. 3 is a schematic block diagram of a wireless interface device (i.e., a radio) 43 which includes a host interface 49, digital receiver processing module 64, an analog-to-digital converter (ADC) 53, a filtering/gain module 68, an down-conversion stage 70, a receiver filter 71, a low noise amplifier 72, a transmitter/receiver switch 73, a local oscillation module 74, memory 75, a digital transmitter processing module 76, a digital-to-analog converter (DAC) 52, a filtering/gain module 80, a mixing up-conversion stage 82, a power amplifier 84, a transmitter filter module 85 and a diversity switch 59. The transmitter/receiver switch 73 is coupled to the diversity switch 59 through which a plurality of antenna elements 89*a-d* are coupled to the wireless interface device. As will be appreciated, the antennas 89*a-d* may be polarized antennas, dual-band antennas with diplexers, directional antennas and/or may be physically separated to provide a minimal amount of interference. In addition, the various antenna elements 89*a-d* may be used for either transmitting or receiving signals, depending on the switching specified by the transmit/receive switch 73. As illustrated, the transmitter/receiver switch 73 and diversity switch 59 selectively couple one or more of the antenna elements 89*a-d* in response to a diversity switching control signal 63 that is provided by the radio interface 65. In addition, a transmit/receive switching control signal 67 may be provided by the PHY module 104 to the transmit/receive switch module 73. In a selected embodiment, the wireless interface device 43 uses the transceiver and antenna to receive and transmit signals in accordance with a first signaling protocol (e.g., IEEE 802.11g) under control of the PHY module 51. To provide dual band communications, the wireless interface device 43 may be coupled to a second transceiver 56 and front end module 58 to receive and transmit signals in accordance with a second signaling protocol (e.g., IEEE 802.11a). In this embodiment, the radio interface generates a control signal 69 to control operation of the transmitter/receiver switch in coordination with the diversity switch 59.

The digital receiver processing module 64, the digital transmitter processing module 76 and the memory 75 execute digital receiver functions and digital transmitter functions in accordance with a particular wireless communication standard. The digital receiver functions include, but are not limited to, digital baseband frequency conversion, demodulation, constellation demapping, decoding and/or descrambling. The digital transmitter functions include, but are not limited to, scrambling, encoding, constellation mapping, modulation and/or digital baseband frequency conversion. The digital receiver and transmitter processing modules 64, 76 may be implemented using a shared processing device, individual processing devices, or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64, 76 implements one or more of its functions via a state machine, analog circuitry, digital circuitry and/or logic circuitry, the memory storing the corresponding operational instructions may be embedded with the circuitry comprising the state machine, analog circuitry, digital circuitry and/or logic circuitry.

In operation, the wireless interface device 43 receives outbound data 94 from the host device via the host interface 49. The host interface 49 routes the outbound data 94 to the digital transmitter processing module 76, which processes the outbound data 94 to produce digital transmission formatted data 96 in accordance with a particular wireless communication standard, such as IEEE 802.11 (including all current and future subsections), Bluetooth, etc. The digital transmission formatted data 96 will be a digital base-band signal or a digital low IF signal, where the low IF typically will be in the frequency range of one hundred kilohertz to a few megahertz. Subsequent stages convert the digital transmission formatted data to an RF signal using a PHY module 51 and radio transmission circuitry, and may be implemented as follows. The digital-to-analog converter 52 converts the digital transmission formatted data 96 from the digital domain to the analog domain. The filtering/gain module 80 filters and/or adjusts the gain of the analog signal prior to providing it to the radio interface module 35. For transmission in accordance with a first signaling protocol (e.g., IEEE 802.11g), the radio interface module 35 provides the filtered/adjusted analog signal to the up-conversion module 82. The mixing stage 82 directly converts the analog baseband or low IF signal into an RF signal based on a transmitter local oscillation clock 83 provided by local oscillation module 74. The power amplifier 84 amplifies the RF signal to produce outbound RF signal 98, which is filtered by the transmitter filter module 85. Antenna switching control signals provided to the transmit/receive switch module 73 and diversity switch module 59 route the outbound RF signal 98 for transmission to a targeted device such as a base station, an access point and/or another wireless communication device via a selected antenna elements 89a-d.

In accordance with a selected embodiment whereby a signal is to be transmitted in accordance with a second signaling protocol (e.g., IEEE 802.11a), the radio interface module 65 provides the filtered/adjusted analog signal to the second transceiver 56. In addition to providing the filtered/adjusted analog signal to the radio transceiver 56, antenna switching control signals 69 are provided to the transmit/receive switch module 77 and diversity switch module 59, which route the outbound RF signal from transceiver 56 for transmission to a targeted device such as a base station, an access point and/or another wireless communication device via selected antenna elements.

In accordance with a selected embodiment whereby a signal is to be received in accordance with a first signaling protocol (e.g., IEEE 802.11g), the wireless interface device 43 receives an inbound RF signal from an antenna via antenna switch module 73, which was transmitted by a base station, an access point, or another wireless communication device. The inbound RF signal is converted into digital reception formatted data, either directly or through an intermediate frequency conversion process which may be implemented as follows. The diversity switch module 59 and transmit/receive switch module 73 provide the inbound RF signal to the receiver filter module 71, where the receiver filter 71 bandpass filters the inbound RF signal. The receiver filter 71 provides the filtered RF signal to low noise amplifier 72, which amplifies the signal to produce an amplified inbound RF signal. The low noise amplifier 72 provides the amplified inbound RF signal to the mixing module 70, which directly converts the amplified inbound RF signal into an inbound low IF signal or baseband signal based on a receiver local oscillation clock 81 provided by local oscillation module 74. The down conversion module 70 provides the inbound low IF signal or baseband signal to the filtering/gain module 68 via the radio interface 65. The filtering/gain module 68 filters and/or gains the inbound low IF signal or the inbound baseband signal to produce a filtered inbound signal. The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by the wireless interface device. The host interface 49 provides the recaptured inbound data 92 to the host device (e.g., 50) via the peripheral interface (e.g., 55).

In accordance with a selected embodiment whereby a signal is to be received in accordance with a second signaling protocol (e.g., IEEE 802.11a), the radio interface module 65 receives the inbound low IF signal or baseband signal 27 from the second transceiver 56. In addition to receiving the inbound low IF signal or baseband signal from the radio transceiver 56, the radio interface 65 provides antenna switching control signals 69 in the transmit/receive switch module 77 and diversity switch module 59, which route the inbound RF signal from a targeted device via selected antenna elements.

As will be appreciated, the wireless communication device described herein may be implemented using one or more integrated circuits. For example, the host device 42 may be implemented on one integrated circuit, the digital receiver processing module 64, the digital transmitter processing module 76 and memory 75 may be implemented on a second integrated circuit, the remaining components of the wireless interface device 43 may be implemented on a third integrated circuit and the second transceiver and antenna elements may be implemented in a fourth integrated circuit. Alternatively, the MAC 50, PHY 51 and radio transceivers 55 and 56 may be implemented as one integrated circuit, the FEM 57 may be implemented as a second integrated circuit and the second transceiver 56 and FEM 58 may be implemented as a third integrated circuit. As another alternate example, the wireless interface device 43 may be implemented on a first integrated circuit and the second transceiver and antenna section 40 may be implemented in a second integrated circuit. As yet another example, the wireless interface device 43 and the second transceiver 56 may be implemented in a single integrated circuit. In addition, the processing module 51 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 51 and the digital receiver and transmitter processing module 64 and 76.

In a selected embodiment, the present invention shows, for the first time, a fully integrated, single chip 802.11b/g solution with connectivity in the 2.4 GHz band, and with built-in support for 802.11a connectivity in the 5 GHz band, all implemented in CMOS Complementary Metal Oxide Semiconductor), as part of a single chip or multi-chip transceiver radio using shared antenna control pins. The present invention enables wireless communication devices (such as WLAN device) to communicate with other wireless devices by controlling multiple transceiver circuits (and their associated antenna switching circuitry) with a shared control signal when priority as between the competing WLAN devices has been allocated.

Figure 4:
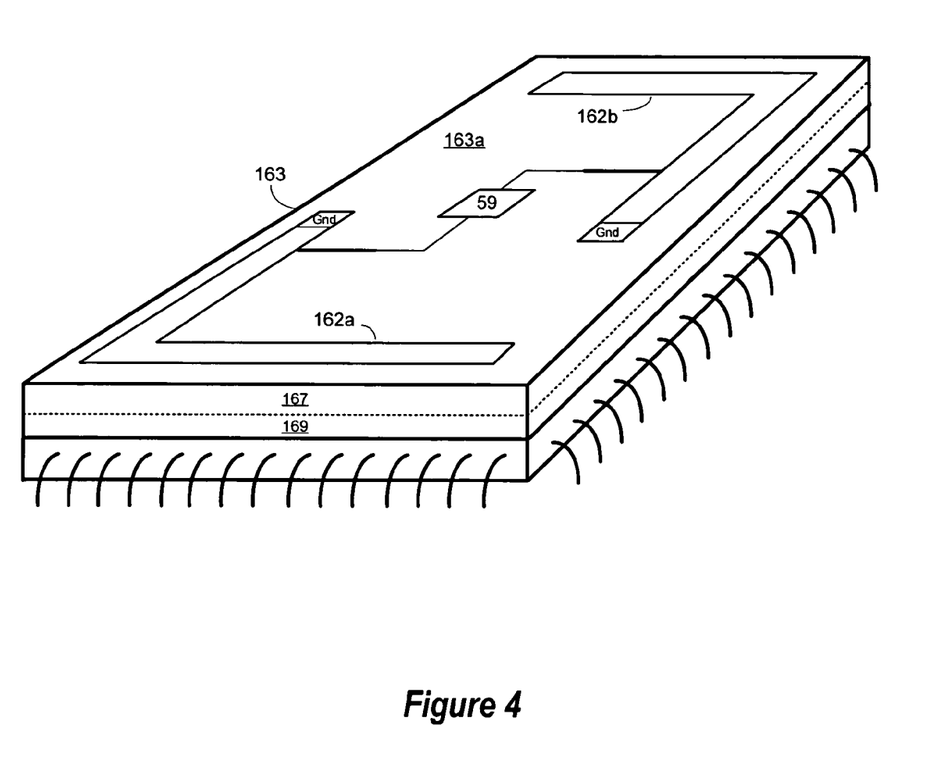
FIG. 4 is an illustration of an embodiment of an integrated circuit having a plurality of antenna elements on the outer surface of the integrated circuit packaging.

FIG. 4 is an illustration of an integrated circuit 163 with a plurality of antenna elements disposed thereon. The integrated circuit comprises a package having a surface 163a, a plurality of layers, illustrated generally by reference numeral 167, and a substrate 169. In one embodiment of the invention, wireless communications are enabled by first and second antenna elements oriented in a predetermined pattern, as discussed hereinbelow. In this embodiment, a first L-shaped antenna element 162a and a second L-shaped antenna element 162b are oriented at diagonally opposed ends of the integrated circuit 163 to optimize wireless communication. The diversity switch 59 is operable to control each of the antenna elements as discussed herein above. In one embodiment of the invention, each of the antenna elements is operable to enable communications at a first frequency. The diversity switch operates in coordination with the radio interface to select the individual antenna element that is able to transmit or receive the strongest signal.

In the embodiment of the invention illustrated in FIG. 4, the antenna elements are disposed on the surface of the packaging of the integrated circuit 163. In an alternate embodiment of the invention illustrated in FIG. 5, the antenna elements and ground plane are disposed in an intermediate layer 167 within the integrated circuit package. In another embodiment of the invention, illustrated in FIG. 6, the antenna elements and ground plane are disposed on the substrate 169 of integrated circuit 163. In various alternate embodiments of the invention, the antenna elements 162a and 162b can be optimized to enable communication on a single frequency in the 2.4 GHz band. The diversity switch is operable to connect the individual antenna element having the greatest signal strength to one of the transceivers and front end modules, e.g., transceiver 55 and front end module 57, to optimize operation of the wireless communication system.

Figure 7:
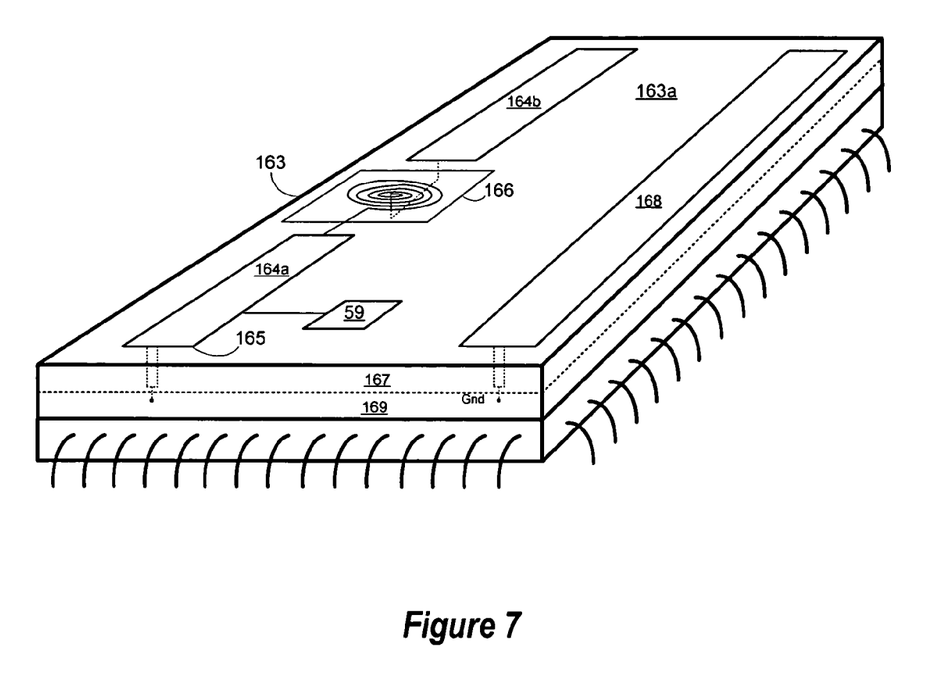
FIG. 7 is an illustration of an alternate embodiment of an integrated circuit having a plurality of antenna elements on the outer surface of the integrated circuit packaging.

FIG. 7 is an illustration of an alternate embodiment of the present invention wherein a plurality of antenna elements are oriented on an integrated circuit to enable wireless communication using collinear array. The collinear array is comprised of tuned linear antenna elements 164a and 164b and a loaded whip, or phasing, section 166 and a linear ground plane 168. The diversity switch 59 is connected to antenna element 164a at a point approximately ⅓ of the length of element 164 measured from the endpoint 165. This configuration allows the combination of the linear elements 164a and 164b and the phasing section to enable communications on multiple frequencies. In open embodiment, the diversity switch is operable to enable the antenna elements to operate in the 2.4 GHz band by connecting transceiver 55 and front end module 57 to the antenna elements. In other embodiments, the diversity switch selectively connects transceiver 56 and front end module 58 to the antenna elements to enable operation in the 5 GHz band.

Figure 8:
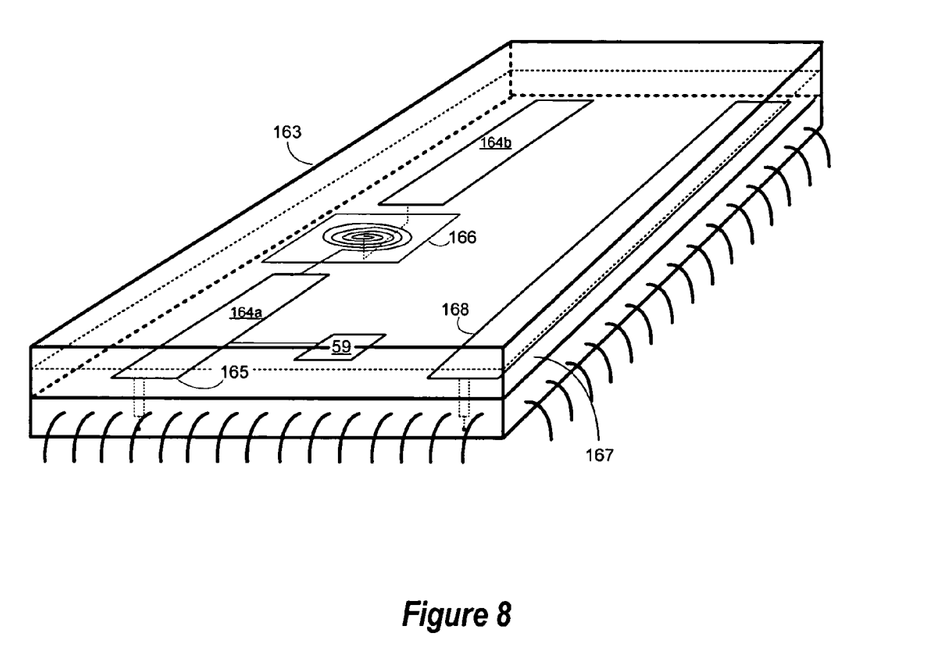
FIG. 8 is an illustration of an alternate embodiment of an integrated circuit having a plurality of antenna elements disposed inside the circuit packaging, but above the integrated circuit substrate.
Figure 9:
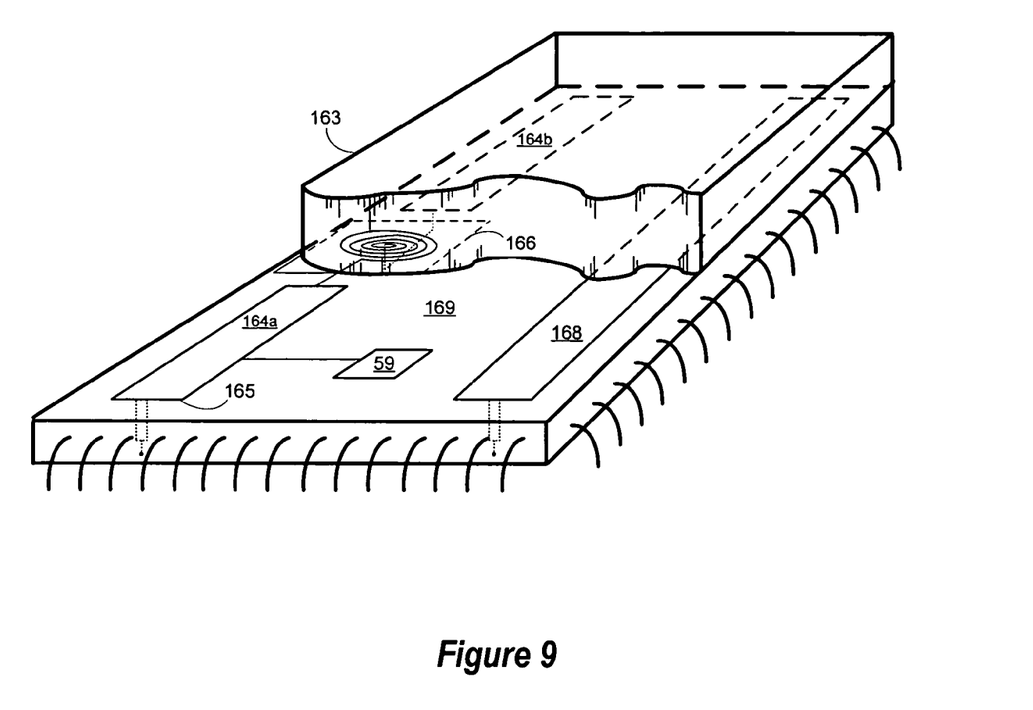
FIG. 9 is an illustration of an alternate embodiment of an integrated circuit having a plurality of antenna elements on a portion of the substrate of the integrated circuit.

In the embodiment of the invention illustrated in FIG. 7, the linear antenna elements 164a-c, the loaded whip 166 and the ground plane 168 are disposed on the surface of the packaging of the integrated circuit 163. In an alternate embodiment of the invention illustrated in FIG. 8, the linear antenna elements 164a-c, the loaded whip 166, and the ground plane 168 are disposed on an intermediate layer within the integrated circuit package. In another embodiment of the invention, illustrated in FIG. 9, the linear antenna elements 164a-c, the loaded whip 166 and the ground plane 168 are disposed on the substrate 169 of integrated circuit 163.

Figure 5:
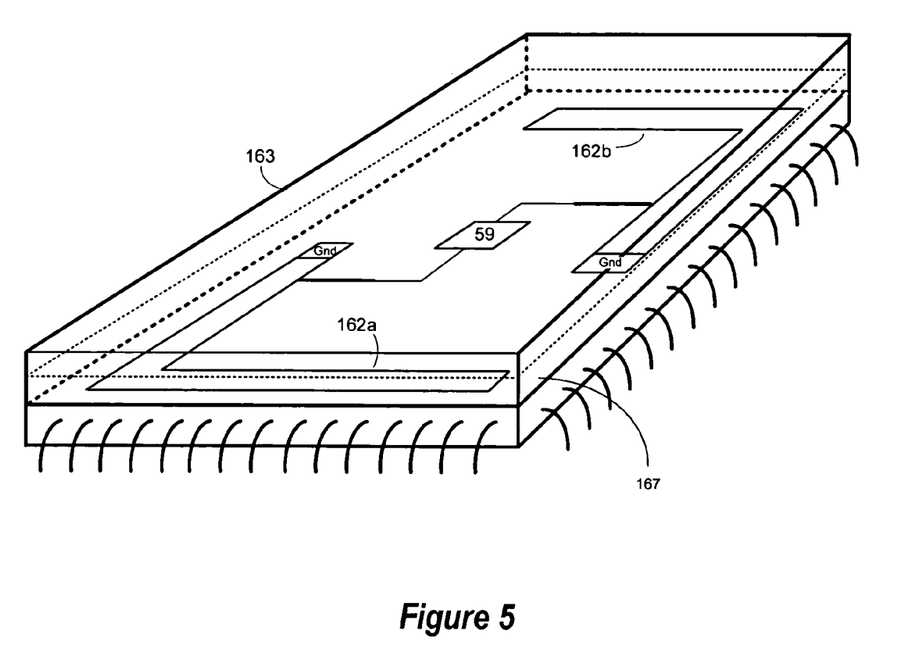
FIG. 5 is an illustration of an embodiment of an integrated circuit having a plurality of antenna elements disposed inside the circuit packaging, but above the integrated circuit substrate.
Figure 6:
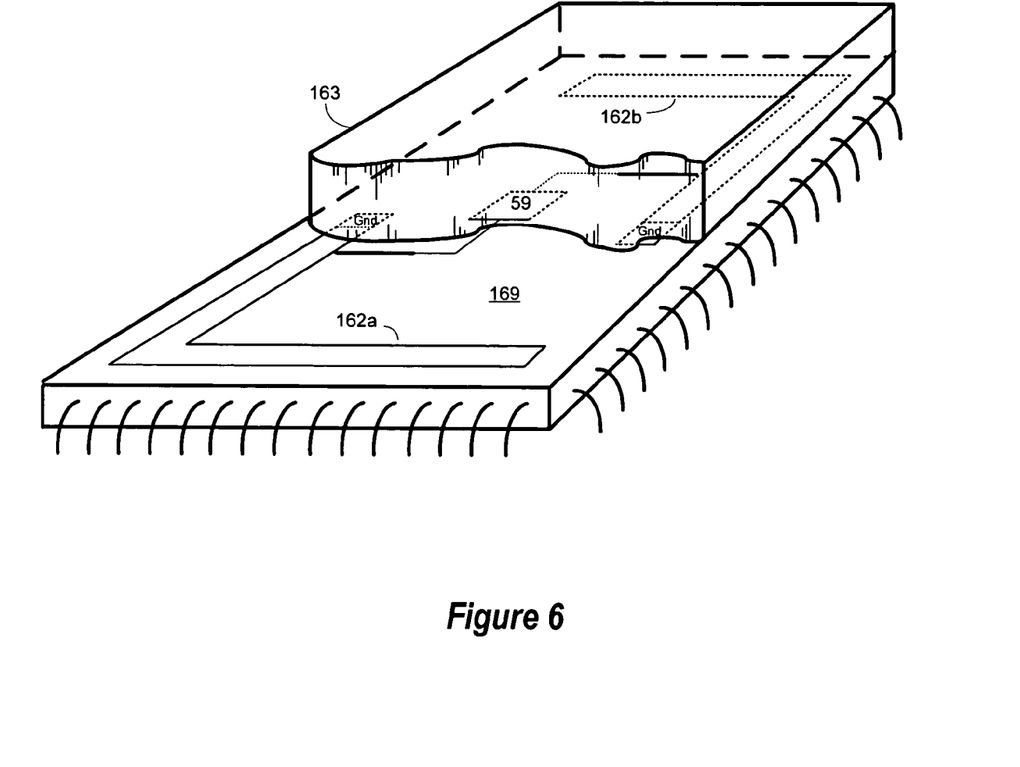
FIG. 6 is an illustration of an embodiment of an integrated circuit having a plurality of antenna elements on a portion of the substrate of the integrated circuit.

Although the embodiments of the invention illustrated in FIGS. 4-6 show antenna elements optimized to enable wireless communication at a single frequency, it is possible to place various combinations of antenna elements in various layers within the integrated circuit to enable communication at multiple frequencies. For example, the L-shaped antenna elements illustrated in FIG. 4 could be placed on the surface of an integrated circuit, while the antenna configuration illustrated in FIG. 9 could be placed on the substrate of the same integrated circuit, thereby enabling communications on multiple frequencies using antenna elements in the same integrated circuit. In various embodiments of the invention, the integrated circuit with each of the aforementioned combination of antenna elements within the various layers of the integrated circuit can be enclosed in a PCMCIA housing.

Wile the system and method of the present invention has been described in connection with the preferred embodiment it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A communication system, comprising:
    a first radio transceiver operable to communicate using RF signals at a first frequency, wherein the first radio transceiver is constructed on a substrate as part of an integrated circuit and disposed in an integrated circuit package;
    a second transceiver operable to communicate using RF signals at a second frequency, wherein the second radio transceiver is also constructed on the substrate and is part of the integrated circuit and disposed in the integrated circuit package;
    a plurality of antenna elements for transmitting and receiving RF signals, wherein the plurality of antenna elements are planar in shape and formed as part of the integrated circuit package by having the antenna elements disposed within or on the integrated circuit package; and
    a diversity switch operably connected to said first and second transceivers and said plurality of antenna elements, said diversity switch being operable to selectively direct RF signals between said first and second transceivers and said plurality of antenna elements.

2. The communication system according to claim 1, wherein the plurality of antenna elements are formed as L-shaped antenna elements, which are formed on a same plane.

3. The communication system according to claim 2, wherein the L-shaped antenna elements are disposed on a surface of the integrated circuit package.

4. The communication system according to claim 2, wherein the L-shaped antenna elements are disposed above the substrate and within layers forming the integrated circuit.

5. The communication system according to claim 2, wherein the L-shaped antenna elements are disposed on the substrate.

6. The communication system according to claim 2, wherein a first L-shaped antenna element is optimized to operate at approximately 2.4 GHz, and a second L-shaped antenna element is optimized to operate at approximately 5 GHz.

7. The communication system according to claim 1, wherein the plurality of antenna elements include first and second tuned linear elements and a phasing section, which are formed as a collinear array on a same plane.

8. The communication system according to claim 7, wherein the first and second tuned linear elements and the phasing section are disposed on a surface of the integrated circuit package.

9. The communication system according to claim 7, wherein the first and second tuned linear elements and the phasing section are disposed above the substrate and within layers forming the integrated circuit.

10. The communication system according to claim 7, wherein the first and second tuned linear elements and the phasing section are disposed on the substrate.

11. The communication system according to claim 7, wherein the first and second tuned linear elements and the phasing section are operable to transmit and receive signals at first and second frequencies, when respectively tuned to the first and second frequencies.

12. The communication system according to claim 11, wherein the first frequency is approximately at 2.4 GHz and the second frequency is approximately at 5 GHz.

13. A method of providing wireless communications comprising:
  transmitting and receiving an RF signal at a first frequency using a first transceiver, wherein the first transceiver is constructed on a substrate as part of an integrated circuit and disposed in an integrated circuit package;
  transmitting and receiving an RF signal at a second frequency using a second transceiver, wherein the second transceiver is also constructed on the substrate and is part of the integrated circuit and disposed in an integrated circuit package;
  using a diversity switch to selectively route the first and second RF signals to a plurality of antenna elements,
  wherein the plurality of antenna elements are planar in shape and formed as part of the integrated circuit package by having the antenna elements disposed within or on the integrated circuit package.

14. The method according to claim 13, wherein the plurality of antenna elements are formed as L-shaped antenna elements, which are formed on a same plane.

15. The method according to claim 14, wherein the L-shaped antenna elements are disposed on a surface of the integrated circuit package.

16. The method according to claim 14, wherein the L-shaped antenna elements are disposed above the substrate and within layers forming the integrated circuit.

17. The method according to claim 14, wherein the L-shaped antenna elements are disposed on the substrate.

18. The method according to claim 14, wherein a first L-shaped antenna element is optimized to operate at approximately 2.4 GHz, and a second L-shaped antenna element is optimized to operate at approximately 5 GHz.

19. The method according to claim 13, wherein the plurality of antenna elements include first and second tuned linear elements and a phasing section, which are formed as a collinear array on a same plane.

20. The method according to claim 13, wherein the first and second tuned linear elements and the phasing section are disposed on a surface of the integrated circuit package.

21. The method according to claim 13, wherein the first and second tuned linear elements and the phasing section are disposed above the substrate and within layers forming the integrated circuit.

22. The method according to claim 13, wherein the first and second tuned linear elements and the phasing section are disposed on the substrate.

23. The method according to claim 13, wherein the first and second tuned linear elements and the phasing section are operable to transmit and receive signals at first and second frequencies, when respectively tunes to the first and second frequencies.

24. The method according to claim 23, wherein the first frequency is approximately at 2.4 GHz and the second frequency is approximately at 5 GHz.

* * * * *